United States Patent
Odukomaiya et al.

(10) Patent No.: US 12,504,238 B2
(45) Date of Patent: Dec. 23, 2025

(54) PHASE CHANGE MATERIAL CORE THERMOPLASTIC SHELL FILAMENT

(71) Applicants: Alliance for Sustainable Energy, LLC, Golden, CO (US); TCPoly, Inc., Atlanta, GA (US)

(72) Inventors: Adewale Odukomaiya, Denver, CO (US); Paramjot Singh, Lakewood, CO (US); Allison Jasmine Mahvi, Lakewood, CO (US); Matthew Kirby Smith, Atlanta, GA (US); Kaif Dosani, Lawrenceville, GA (US)

(73) Assignees: Alliance for Sustainable Energy, LLC, Golden, CO (US); TCPoly, Inc., Atlanta, GA (US)

( * ) Notice: Subject to any disclaimer, the term of this patent is extended or adjusted under 35 U.S.C. 154(b) by 582 days.

(21) Appl. No.: 17/586,941

(22) Filed: Jan. 28, 2022

(65) Prior Publication Data
US 2022/0243998 A1  Aug. 4, 2022

Related U.S. Application Data

(60) Provisional application No. 63/143,165, filed on Jan. 29, 2021.

(51) Int. Cl.
*F28D 20/02* (2006.01)
*B29C 64/165* (2017.01)
(Continued)

(52) U.S. Cl.
CPC .......... *F28D 20/023* (2013.01); *B29C 64/165* (2017.08); *B29K 2101/12* (2013.01);
(Continued)

(58) Field of Classification Search
CPC .......... F28D 20/023; F28D 2020/0047; F28D 2020/0026; F28D 2020/0021;
(Continued)

(56) References Cited

U.S. PATENT DOCUMENTS 6,271,278 B1 * 8/2001 Park ........................ A61L 15/60
521/142
8,801,990 B2 8/2014 Mikulak et al.
(Continued)

FOREIGN PATENT DOCUMENTS

CN 107760274 A * 3/2018

OTHER PUBLICATIONS

Shahid Bashir, Fundamental Concepts of Hydrogels: Synthesis, Properties, and their Application , Nov. 16, 2020, section 5.2.3. Website link: https://www.mdpi.com/2073-4360/12/11/2702 (Year: 2020).*

(Continued)

*Primary Examiner* — Tho V Duong
(74) *Attorney, Agent, or Firm* — Alexandra M Hall (57) ABSTRACT

The present disclosure relates to encapsulation of a phase change material (PCM) enabled by extrusion of a thermoplastic polymer shell and a PCM core, which can be additively manufactured to form a variety of designs for use in a variety of settings, including for use as thermal energy storage devices in building heating ventilation and air conditioning (HVAC) systems. The thermoplastic polymer shell surrounding a PCM core may be used as a filament in three-dimensional (3D) printing or may be extruded during the additive manufacturing process.

7 Claims, 8 Drawing Sheets

(51) Int. Cl.
  *B29K 101/12* (2006.01)
  *B33Y 10/00* (2015.01)
  *B33Y 70/10* (2020.01)
  *B33Y 80/00* (2015.01)
  *C09K 5/06* (2006.01)

(52) U.S. Cl.
  CPC .............. *B33Y 10/00* (2014.12); *B33Y 70/10* (2020.01); *B33Y 80/00* (2014.12); *C09K 5/063* (2013.01)

(58) Field of Classification Search
  CPC ............ F28D 2020/0004; C09K 5/063; B29C 64/165; B33Y 10/00; B33Y 80/00; B33Y 70/10; B29K 2101/12
  See application file for complete search history.

(56) References Cited

U.S. PATENT DOCUMENTS

| | | | |
|---|---|---|---|
| 8,920,697 B2 | 12/2014 | Mikulak et al. | |
| 9,303,912 B1* | 4/2016 | Schalla ................. | A47B 31/02 |
| 9,738,031 B2 | 8/2017 | Mikulak et al. | |
| 10,011,922 B2 | 7/2018 | Graley et al. | |
| 10,563,324 B2 | 2/2020 | Graley et al. | |
| 10,695,979 B2 | 6/2020 | Mikulak et al. | |
| 11,207,831 B2 | 12/2021 | Lewis et al. | |
| 2010/0055365 A1* | 3/2010 | Nakajima ............... | C08G 73/14 |
| | | | 428/36.9 |
| 2010/0120929 A1* | 5/2010 | Naito ........................ | C08F 2/20 |
| | | | 521/57 |
| 2012/0048768 A1* | 3/2012 | Holloway ............... | C09K 5/063 |
| | | | 206/524.1 |
| 2015/0210032 A1* | 7/2015 | Blackford ................ | B32B 7/02 |
| | | | 428/196 |
| 2018/0238636 A1* | 8/2018 | Chopard ............ | F01M 11/0004 |
| 2018/0325723 A1* | 11/2018 | Shih .......................... | A61F 7/02 |
| 2019/0021186 A1 | 1/2019 | Poltorak | |
| 2019/0134971 A1 | 5/2019 | Nielson-Cole et al. | |
| 2020/0109901 A1 | 4/2020 | Mayberry et al. | |
| 2020/0139693 A1 | 5/2020 | Nielson-Cole et al. | |
| 2020/0164109 A1 | 5/2020 | Kroll et al. | |
| 2020/0298467 A1 | 9/2020 | Cakmak et al. | |
| 2020/0368570 A1* | 11/2020 | Hodgen ................ | A62D 1/0064 |
| 2021/0017084 A1* | 1/2021 | Suzuki ................ | H01L 23/3735 |

OTHER PUBLICATIONS

English translation of CN-107760274A, Cheng Yadong (Year: 2018).*
Biswas et al., "Additive manufacturing integrated energy-enabling innovative solutions for buildings of the future", Journal of Solar Energy Engineering, 2017, vol. 139, No. 1, pp. 015001-1-015001-10.
Cabeza et al., "Materials used as PCM in thermal energy storage in buildings: A review", Renewable and Sustainable Energy Reviews, 2011, vol. 15, No. 3, pp. 1675-1695.
Camacho et al., "Applications of additive manufacturing in the construction industry—A forward-looking review", Automation in construction, 2018, vol. 89, pp. 110-119.
Freeman et al., "Phase-Change Materials/HDPE Composite Filament: A First Step Toward Use With 3D Printing for Thermal Management Applications", Journal of Thermal Science and Engineering Applications, Oct. 2019, vol. 11, pp. 054502-1-054502-7.
Liu et al., "Review on storage materials and thermal performance enhancement techniques for high temperature phase change thermal storage systems", Renewable and Sustainable Energy Reviews, 2012, vol. 16, No. 4, pp. 2118-2132.
Loke et al., "Structured multimaterial filaments for 3D printing of optoelectronics", Nature communications, 2019, vol. 10, No. 4010, pp. 1-10.
Mohamed et al., "A review on current status and challenges of inorganic phase change materials for thermal energy storage systems", Renewable and Sustainable Energy Reviews, 2017, vol. 70, pp. 1072-1089.
Neugebauer et al., "Additive manufacturing boosts efficiency of heat transfer components" Assembly Automation, 2011, vol. 31, No. 4, pp. 344-347.
Pack et al., "Carbon Fiber and Syntactic Foam Hybrid Materials via Core-Shell Material Extrusion Additive Manufacturing", Advanced Materials Technologies, 2020, vol. 5, No. 12, 2000731, pp. 1-8.
Peng et al., "Enhanced impact resistance of three-dimensional-printed parts with structured filaments", ACS Applied Materials & Interfaces, 2018, vol. 10, No. 18, pp. 16087-16094.
Peng et al., "3D printing with core-shell filaments containing high or low density polyethylene shells", ACS Applied Polymer Materials, 2019, vol. 1, No. 2, pp. 275-285.
Rigotti et al., "3D printable thermoplastic polyurethane blends with thermal energy storage/release capabilities", Materials Today Communications, 2018, vol. 15, pp. 228-235.
Ryder et al., "Fabrication and properties of novel polymer-metal composites using fused deposition modeling", Composites Science and Technology, 2018, vol. 158, pp. 43-50.
Souayfane et al., "Phase change materials (PCM) for cooling applications in buildings: A review", Energy and Buildings, 2016, vol. 129, pp. 396-431.

* cited by examiner

PHASE CHANGE MATERIAL CORE THERMOPLASTIC SHELL FILAMENT

CROSS-REFERENCE TO RELATED APPLICATIONS

This application claims priority to U.S. Provisional Patent Application No. 63/143,165 filed on Jan. 29, 2021, the contents of which are incorporated herein by reference in their entirety.

CONTRACTUAL ORIGIN

This invention was made with government support under Contract No. DE-AC36-08GO28308 awarded by the U.S. Department of Energy. The United States government has certain rights in this invention.

BACKGROUND

Thermal energy storage (TES) in buildings can assist in improving the efficiency and resiliency of the grid and the buildings themselves. TES in buildings can reduce and/or time-shift the large electric demands of thermal equipment or large appliances. Integrating TES within a building's heating, ventilation, and air conditioning (HVAC) system can also enable greater penetration of intermittent renewables—the HVAC system can operate at times when renewable electricity is available, and store and dispatch heating or cooling to the building when it is needed.

Phase change materials (PCMs) are a class of TES materials with the ability to store a large amount of thermal energy while maintaining a relatively constant temperature. PCMs may be used for TES in buildings (both in the building envelope and in HVAC systems) and in thermal management of batteries, electronics, vehicles, medical devices, food products and storage, and other heating and cooling chain applications.

PCMs have struggled with practical use in buildings due to significant subcooling effects, phase segregation, cycling hysteresis, and corrosiveness issues, among other things. The ability to contain PCMS and control the placement of PCMs in building applications has also prevented them from being widely available. Thus, there remains a need for practical manufacturing processes for PCMs.

SUMMARY

An aspect of the present disclosure is a thermal energy storage device which includes a shell comprising a thermoplastic polymer, and a core comprising a phase change material, in which the shell comprises a length and an interior, and the core is positioned within the interior of the shell and extends through the length of the shell. In some embodiments, the thermoplastic polymer includes at least one of polycaprolactone (PCL), thermoplastic polyurethane (TPU), polylactic acid (PLA), acrylonitrile butadiene styrene (ABS), polyvinyl alcohol (PVA), polyethylene terephthalate (PET), or polycarbonate (PC). In some embodiments, the phase change material includes a salt hydrate, a hydrogel, and a nucleating agent. In some embodiments, the salt hydrate includes at least one of sodium sulfate decahydrate, calcium chloride hexahydrate, disodium hydrogen phosphate dodecahydrate, or sodium acetate trihydrate. In some embodiments, the hydrogel comprises poly(acrylamide-co-acrylic acid). In some embodiments, the nucleating agent comprises borax. In some embodiments, the phase change material is about 1-10 wt % hydrogel, 1-5 wt % nucleating agent, and 99-85 wt % salt hydrate.

An aspect of the present disclosure is a method of additive manufacturing a phase change material, the method including extruding a shell comprising a thermoplastic polymer and having a length and an interior and filling a core comprising the phase change material into the interior of the shell, in which the core extends the length of the shell. In some embodiments, the extruding and the filling are performed substantially simultaneously. In some embodiments, the extruding and filling are performed at 75-100° C. In some embodiments, the method also includes forming a design with the shell and the core on a bed. In some embodiments, the bed has a temperature of approximately 40-90° C. In some embodiments, the extruding and the filling are performed using a nozzle. In some embodiments, the nozzle includes a spider die. In some embodiments, the thermoplastic polymer includes at least one of polycaprolactone (PCL), thermoplastic polyurethane (TPU), polylactic acid (PLA), acrylonitrile butadiene styrene (ABS), polyvinyl alcohol (PVA), polyethylene terephthalate (PET), or polycarbonate (PC). In some embodiments, the phase change material includes a salt hydrate. In some embodiments, the salt hydrate includes at least one of sodium sulfate decahydrate, calcium chloride hexahydrate, disodium hydrogen phosphate dodecahydrate, or sodium acetate trihydrate.

An aspect of the present disclosure is a system for additive manufacturing a phase change material, the system including a nozzle, a thermoplastic polymer, and the phase change material, in which the nozzle is configured to extrude a shell comprising the thermoplastic polymer and having a length and an interior, the nozzle is configured to fill a core comprising the phase change material into the interior of the shell, and the core extends the length of the shell. In some embodiments, the system also includes a bed, in which the shell and the core are configured to form a design on the bed. In some embodiments, the bed has a temperature of 40-90° C.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

| REFERENCE NUMERALS | |
|---|---|
| 100 | thermal energy storage device |
| 105 | core |
| 110 | shell |
| 200 | first system |
| 205 | 3D printer |
| 210 | bed |
| 215 | design |
| 220 | nozzle |
| 400 | second system |
| 500 | PCM |
| 505 | thermoplastic polymer |
| 510 | pump |
| 515 | first cavity |
| 520 | second cavity |
| 700 | spider die |
| 705 | outer body |
| 800 | method |
| 805 | extruding |
| 810 | filling |
| 815 | forming |

DETAILED DESCRIPTION

The embodiments described herein should not necessarily be construed as limited to addressing any of the particular problems or deficiencies discussed herein. References herein to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the terms "substantially" and/or "approximately" are used to indicate that exact values are not necessarily attainable. In some embodiments, the terms "substantially" and/or "approximately" are defined as approaching a specific numeric value or target within 20%, 15%, 10%, 5%, or within 1% of the value or target. In further embodiments, the terms "substantially" and/or "approximately" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to encapsulation of a phase change material (PCM) enabled by extrusion of a thermoplastic polymer shell and a PCM core, which can be additively manufactured to form a variety of designs for use in a variety of settings, including for use as thermal energy storage (TES) devices in building heating ventilation and air conditioning (HVAC) systems. In some embodiments, the thermoplastic polymer shell surrounding a PCM core may be used as a filament in three-dimensional (3D) printing. The filament may be fed directly into the extrusion head of a 3D printer and be used to create complex geometries for TES applications. In other embodiments, the thermoplastic polymer shell surrounding a PCM core may be extruded during the additive manufacturing process (i.e., the shell and core may be extruded simultaneously).

The co-extrusion (or co-printing) of a PCM core-thermoplastic shell filament (i.e., a TES device) can be done using 3D printing or additive manufacturing. Using a thermoplastic (or thermally conductive) polymer as a PCM encapsulant and heat exchanger material creates a lightweight, low-cost, and corrosion-resistant component with greater design freedom than traditionally manufactured systems. The present disclosure enables the creation of a design framework to increase the energy and power density of devices using computational topology optimization and the development of software controls for co-printing PCMs and thermoplastic matrices to enable spatial control of the PCM core-thermoplastic shell fraction.

The key attributes of a TES device are its energy and power densities—the total available storage capacity and the speed at which it may be accessed, respectively. PCMs are promising energy storage mediums because they can absorb and release heat at a nearly constant temperature as they transition phases. An ideal PCM heat exchanger would provide fluid at the transition temperature of the storage material, but the fluid outlet temperature depends on many factors, including the thermophysical properties of the storage medium (thermal conductivity, heat of fusion, density, transition temperature, heat capacity), the operating conditions (power density), and the device design (considering associated thermal resistances). The output temperature is important because it dictates how much of the stored capacity may be extracted from the device before the maximum useful temperature is reached. The outlet fluid temperature ($T_{f,out}$), or the useable output from the system, may be approximated with:

$$T_{f,out} \approx 2\left[\overline{T}_t + \underbrace{\dot{q}(R_{PCM} + R_f + R_{contact})}_{\text{thermal resistances}}\right] - T_{f,in}$$

This equation shows that the driving properties determining performance are the rate at which heat is needed to move in and out of the device ($\dot{q}$), the PCM transition temperature ($T_t$), and the internal thermal resistances, which include the PCM conductive resistance ($R_{PCM}$), the contact resistance between the PCM and fluid channels ($R_{contact}$), and the fluid conductive resistance ($R_f$). The equation also shows that a device with low internal resistances will enable the use of higher transition temperature materials (higher charging efficiency) and increase the achievable power density. Past efforts have mainly focused on reducing internal resistances through development of high thermal conductivity PCM composites, but this often comes at the cost of energy density.

In the present disclosure, PCM resistance may be minimized by increasing the heat transfer area of the PCM and the PCM thermal conductivity while decreasing the thickness of liquid PCM layers between the working fluid and the melt front. Contact resistance may be addressed by integrating the fluid channels directly into the storage material. Fluid resistance may be reduced by increasing the heat transfer area and introducing mixing into the flow to increase the heat transfer coefficient. In some embodiments, the PCM material may be fully sealed by the thermoplastic shell and the combination of the two may be easily manufactured in a variety of shapes.

The 3D-printable composites created by the PCM core-thermoplastic shell as described herein may combine salt hydrates and high thermal-conductivity polymers to achieve PCM loading of greater than about 70% while allowing heat to move in and out of the PCM core-thermoplastic shell. In some embodiments, co-printing a PCM in an annular shell of the thermally conductive polymer using a standard 3D printer with a modified nozzle. This may result in high PCM loading while increasing the effective thermal conductivity and fully sealing the PCM in a polymer (or thermoplastic) shell to prevent leaks when the PCM is in a liquid phase. The present disclosure utilizes computational topology optimization to determine an effective device architecture. In some embodiments, printing the device and experimentally comparing its energy- and power-density to a standard design.

In some embodiments, the thermoplastic polymer may have a thermal conductivity in the range of about 0.5 W/m·K to about 15 W/m·K. In some embodiments, the thermoplastic polymer may have a thermal conductivity of greater than about 1 W/m·K. The melting temperature of the thermoplastic polymer may be in the range of about 10° C. to about 300° C. In some embodiments, the melting temperature of the thermoplastic polymer may be in the range of about 50° C. to about 250° C. The thermoplastic polymer may be a length of tubing or piping with a hollow core in the longitudinal direction. As used herein, thermoplastic refers to a material, such as a plastic polymer, which becomes pliable or malleable when heated and solidified when cooled, which can be heated and cooled many times without any change in its chemical or mechanical properties. Examples of thermoplastic polymers include of a polycaprolactone (PCL), a thermoplastic polyurethane (TPU), a polylactic acid (PLA), an acrylonitrile butadiene styrene (ABS), a polyvinyl alcohol (PVA), a polyethylene terephthalate (PET), a polycarbonate (PC), a polyacetylene, a polythiophene (PT), such as poly[3,4-(ethylenedioxy)thiophene], a polypyrrole (PPy), a polyphenylene, and/or a polyaniline (PAM). In some embodiments, the thermoplastic polymer may also include thermally conductive filler particles. Such thermally conductive filler particles may be added at a loading of about 10-60 wt %. Replacing metal through the use of a thermally conductive polymer as both the PCM encapsulant and heat exchanger material ensures a lightweight, low-cost, and corrosion-resistant component that has more design freedom than traditionally manufactured systems. The elasticity of the polymer encapsulant (thermoplastic) may help absorb mechanical stresses due to the PCM volume change during phase transition.

In some embodiments, the PCM may be an inorganic material, such as a salt hydrate, nitrate, and/or metallic compound or a mixture containing a salt hydrate, nitrate, and/or metallic compound. Inorganic, salt-hydrate based PCMs are cheap, energy dense, non-flammable, and non-corrosive. In other embodiments, the PCM may be an organic material, which may contain paraffins or may be a nonparaffin organic PCM. Examples of PCMs containing paraffins include n-tetradecane, n-hexadecane, n-octadecane, and/or eicosane. Examples of nonparaffin PCMs include fatty acids having a chemical formula of $CH_3(CH_2)_2NCOOH$, capric acid, lauric acid, and/or palmitic acid. In some embodiments, the PCM may be a mixture of paraffin and nonparaffin PCM materials. The PCM may be filled into the empty core of the thermoplastic polymer using a syringe-based system or another method of extruding or pumping the PCM. The present disclosure may utilize organic and/or inorganic PCM material for the PCM core.

Extrusion-based printing, as described in some embodiments herein, requires melting the thermoplastic polymer for deposition. In some embodiments, the PCM core is extruded with the thermoplastic, so the PCM must withstand the elevated melting temperature so as to not leak out of the polymer encapsulant as it is printed because it may be in a liquid state.

In some embodiments, the PCM core may be a tetrabutylammonium bromide (TBAB) hydrate composition comprising the PCM, a nucleating agent, and potassium poly(acrylamide-acrylic acid) [P(AM-AA)K+] serving as a thickening agent which helps prevent thermal decomposition and increases the viscosity, providing form stability. In some embodiments, the nucleating agent may have a weight percentage of 3 wt. % and the thickening agent may have a weight percentage of 4 wt. %. The thickening agent and in-process encapsulation from the printing process may also aid in preventing phase segregation by serving as caging, preventing any solid particles from spreading. In some embodiments, sodium poly(acrylamide-acrylic acid) [P(AA-AM)Na+] hydrogel may be effective as a thickening agent at 2 wt. % and silver iodide (AgI) may be effective as a nucleating agent with 1 wt. %. Inclusion of P(AM-AA)Na+ slightly broadens water's phase change region, increasing the peak transition temperature by about 2° C., a beneficial side effect for air conditioning applications. In some embodiments, PDMS may be an effective thickening agent.

Most polymers (or thermoplastics) melt at temperature above 150° C. As the present disclosure describes the PCM and polymer being co-extruded together, these elevated temperatures may cause thermal decomposition of the PCM. In some embodiments, polycaprolactone (PCL) which melts at 60° C. may be used as a base polymer in the thermoplastic. This may increase the thermal conductivity of the thermoplastic (or polymer) by adding high thermal conductivity fillers such as hexagonal boron nitride (k of approximately 400 W/mK) and carbon black (k of approximately 500 W/mK). The TES device as described herein may be extruded at temperatures of less than about 70° C. The extrusion of the TES device may be done at a temperature higher than the melting temperature of the thermoplastic polymer for the shell. This may ensure no decomposition of the PCM as it is extruded with the polycaprolactone (PCL) base polymer and thermal conductivity additive that may be used as an annular thermoplastic shell.

In some embodiments, PCM formulations with transition temperatures suitable in air conditioning applications may be used. These PCM formulations may comprise a PCM, a nucleating agent to suppress subcooling, and a thickening agent to increase viscosity for improved printability and prevention of phase segregation. The PCM formulations may use TBAB hydrate, water, and tetradecane as the PCM. P(AM-AA)K+ may be used as a thickening agent and sodium phosphate dibasic dodecahydrate ($Na_2HPO_4.12H_2O$) may be used as a nucleating agent for the TBAB hydrate. For water, P(AM-AA)Na+ may be used to thicken, and silver iodide (AgI) may be used as a nucleating agent. Tetradecane is a paraffin wax and does not generally suffer from significant subcooling, therefore, only PDMS may be needed as a thickener.

In some embodiments of the present disclosure, PCM core-thermoplastic shell composites may have an effective conductivity of greater than 1 W/mK and PCM loading of greater than 70%. In some embodiments, the maximum energy density may be greater than about 65 kWh/m$^3$ with water, greater than about 40 kWh/m$^3$ with TBAB hydrate, and greater than about 30 kWh/m$^3$ with tetradecane. In some embodiments, the designs created by the TES device may have a capacity of greater than about 200 Wh, a PCM loading of greater than about 60%, and may be able to fully discharge (1 C) in less than one hour.

Figure 1:
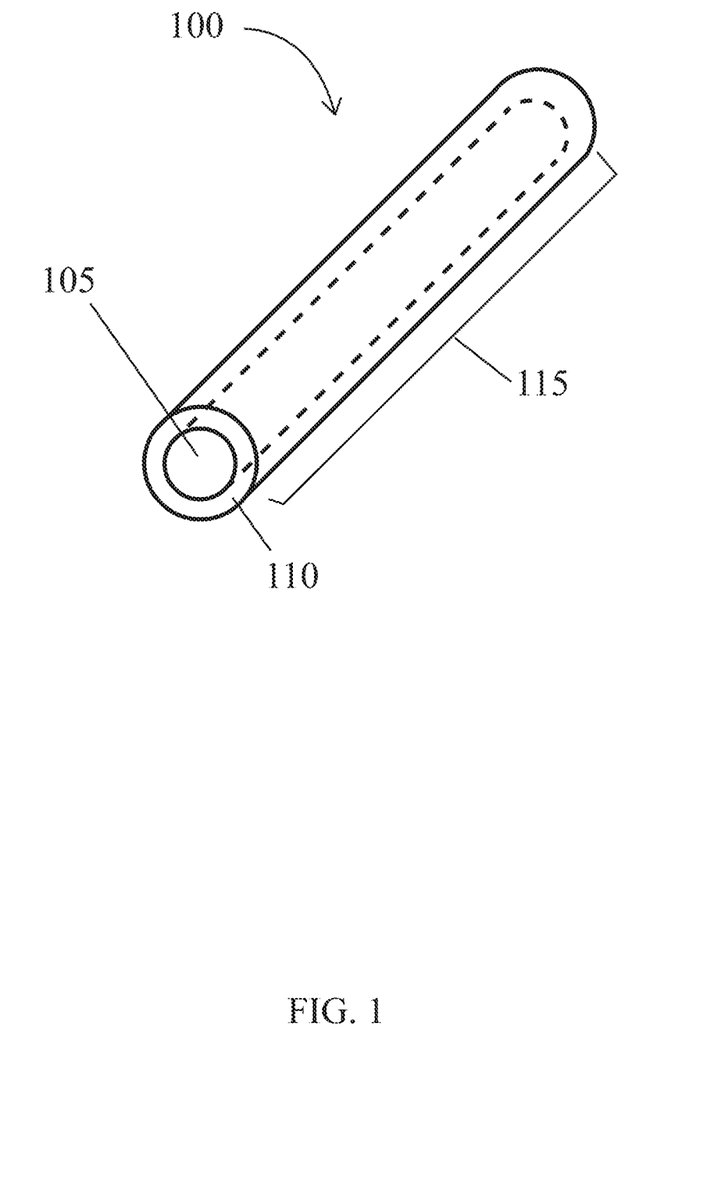
FIG. 1 illustrates an additively manufactured thermal energy storage (TES) device, according to some aspects of the present disclosure.

FIG. 1 illustrates a TES device 100, according to some aspects of the present disclosure. The TES device 100 shown in FIG. 1 includes a shell 110 made of a thermoplastic polymer and a core 105 made of a PCM or PCM composite. As shown in FIG. 1, the shell 110 has a length 115 and the core 105 is positioned within the interior of the shell 110 and extends through the length 115 of the shell 110.

In some embodiments, topology optimization is used as a technique that exploits the vast design freedom provided by additive manufacturing to create non-intuitive designs that improve performance. Topology optimization aims to minimize a predefined cost function (e.g., heat transfer resistances) while simultaneously fulfilling constraint functions (e.g., maximizing the storage capacity) in the presence of a given set of loads and boundary conditions. For thermal energy storage (TES), the cost functions are the fluid pressure drop and the thermal resistances between the fluid and the melt front. In some embodiments, a multiphase topology optimization is used where the design variables at any location inside the problem domain may represent a thermally conductive polymer, a PCM, or a fluid channel. For TES devices, the cost functions are the fluid pressure drop and the thermal resistances between the fluid and the melt front. A multiphase topology optimization as described herein uses design variables at any locations inside the problem domain may represent a thermoplastic, a PCM, or a fluid channel.

Figure 2:
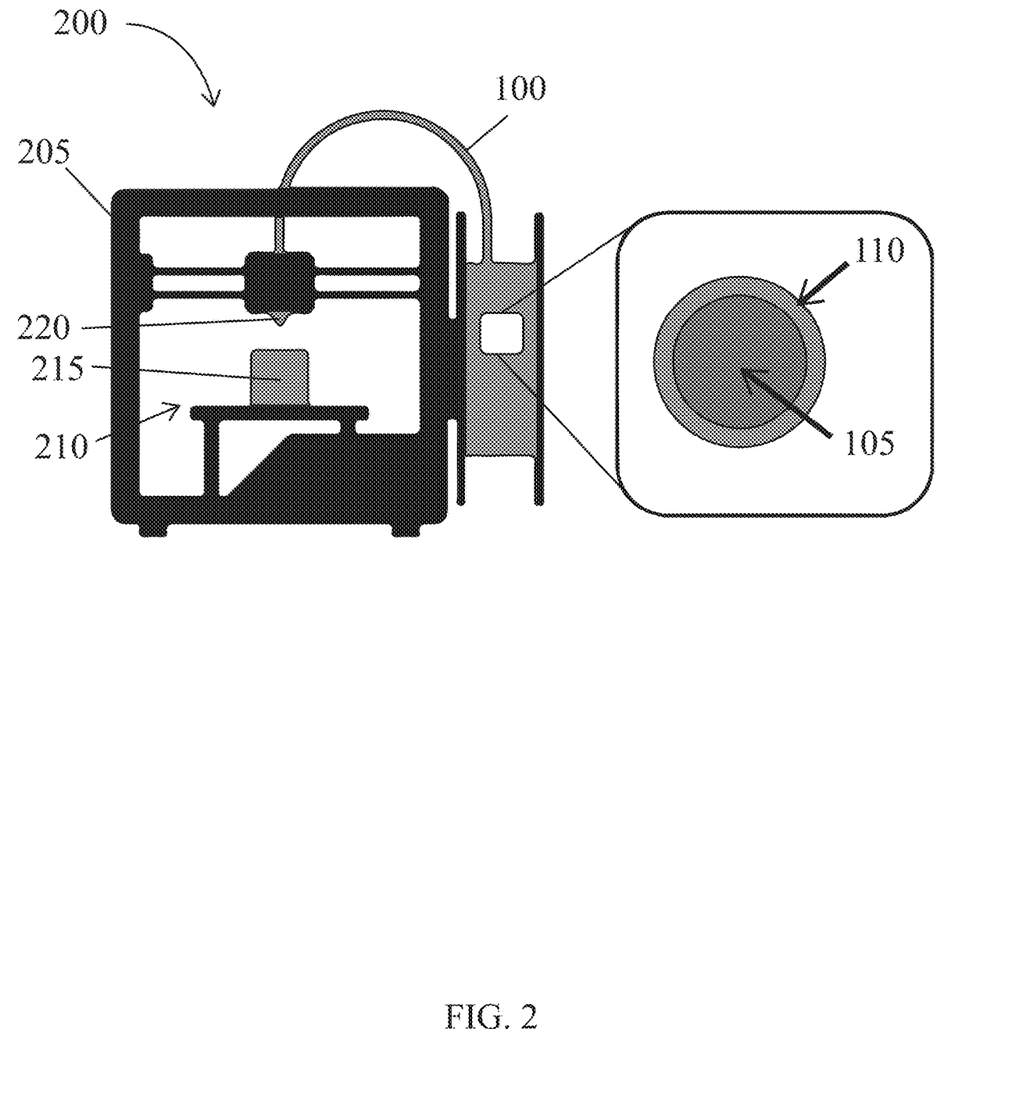
FIG. 2 illustrates a first exemplary system for additively manufacturing a TES device, according to some aspects of the present disclosure.

FIG. 2A illustrates how a filament (or TES device 100) made of a PCM core 105 and thermoplastic polymer shell 110 may be used in printing with a first extrusion-based additive manufacturing system 200, according to some aspects of the present disclosure. The TES device 100 has a tubing or piping of thermoplastic (i.e., the shell 110) containing a PCM core 105, as shown in FIG. 1. This TES device 100 may be used in a traditional 3D printer or other additive-based manufacturing system to deposit material and/or extrude designs containing the TES device 100. This allows for rapid prototyping of TES designs. Thermoplastics are resistant to corrosion, which is a common problem for PCMs encased by metal storage containers. In some embodiments, the prevent disclosure includes printable PCMs made from water and tetradecane.

Figure 3:
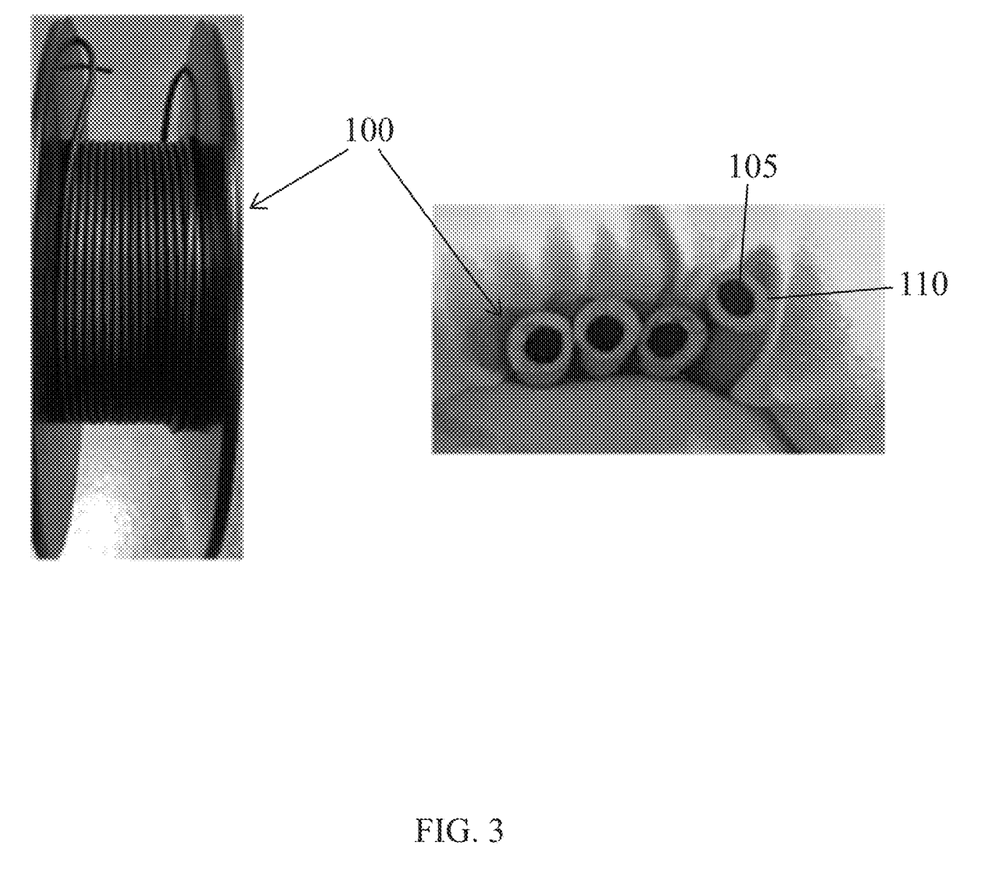
FIG. 3 illustrates photos of a TES device both in filament and in a cross section, according to some aspects of the present disclosure.

FIG. 3 illustrates a spool of filament (or TES device 100) and a cross-sectional image of the TES device 100, according to some aspects of the present disclosure. As shown in FIG. 3, the TES device may have a cross section which is substantially circular (or round or elliptical), although other geometries are possible. In some embodiments, the TES device 100 may be in the form of a filament for 3D printing (that is, the TES device 100 may be fed into a 3D printer 205 and extruded to form a design 215) as shown in FIG. 2. A filament of the TES device 100 may be wound into a spool for ease of being fed into the nozzle 220 of a 3D printer 205.

Figure 4A:
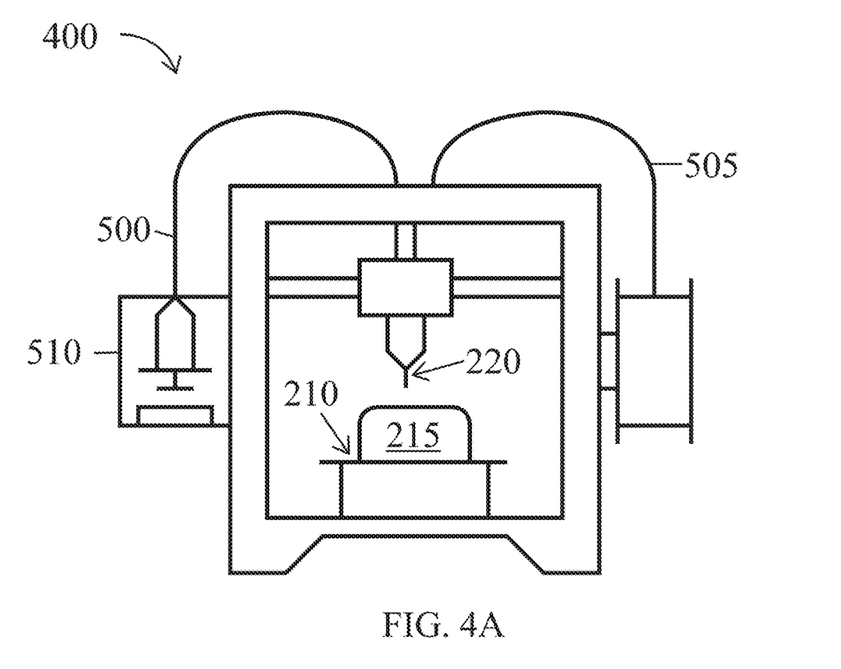
FIG. 4A illustrates a second exemplary system for additively manufacturing a TES device and FIG. 4B illustrates a dual material extrusion nozzle for extruding a TES device, according to some aspects of the present disclosure.

FIG. 4A illustrates a second exemplary system 400 for additively manufacturing a design 215 using a PCM core 105 and thermoplastic polymer shell 110, according to some aspects of the present disclosure. The second system 400 in FIG. 4 may extrude the thermoplastic shell 110 and insert the PCM core 105 simultaneously, or near simultaneously, in a single step through a single nozzle 220. This may be done using an integrated die (such as a spider die 700) and/or nozzle 220 with a hollow channel allowing for the passage of PCM 500 while the thermoplastic polymer 505 flows around that channel to form a stable shell 110 around the PCM 500 core 105.

Depositing a PCM core 105 in a thermoplastic polymer shell 110 to form a TES device 100 may reduce or eliminate leakage issues, particularly for solid-liquid PCMs. The TES device 100 described herein may provide efficient heat transfer rates compared to current PCM systems through an improved conductive path through the thermoplastic polymer shell 110 material. The present disclosure includes methods which may be used for microencapsulation and macroencapsulation of organic and inorganic PCMs. The thermoplastic polymer shell 110 may be less likely to corrode than traditional metallic storage containers, allowing the PCM core-thermoplastic polymer shell 110 to be used for longer storage times.

Figure 4B:
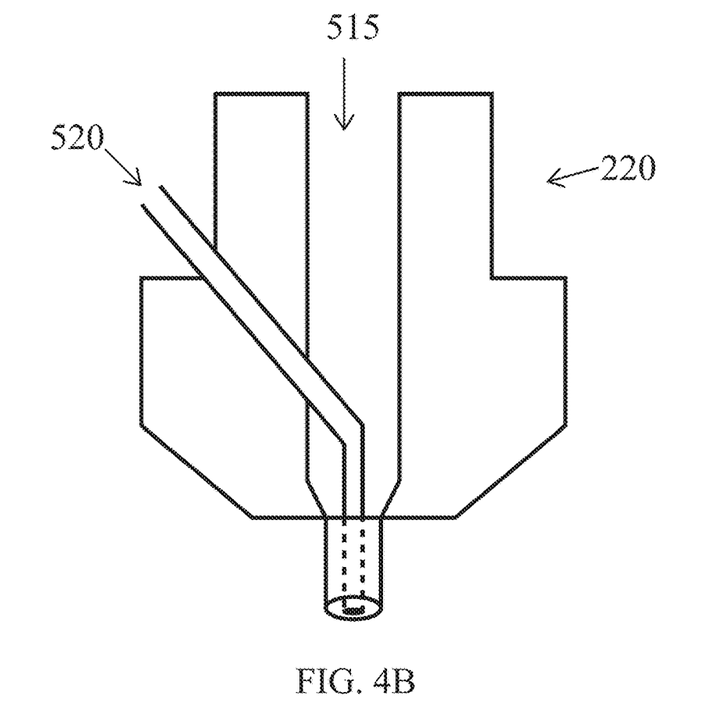

FIG. 4A illustrates a TES device 100 co-printing system 200, FIG. 4B illustrates an extrusion nozzle design for co-printing a TES device 100, according to some aspects of the present disclosure. The system 200 includes a nozzle 220 (shown in detail in FIG. 4B), a thermoplastic polymer 505, and a PCM 500. The nozzle 220 extrudes the shell 110 (not shown in FIG. 4) and fills the interior of the shell 110 with the core 105 (not shown in FIG. 4) throughout the length of the shell 110. The system 200 in FIG. 4A also includes a bed 210, which is the location where the design 215 created by the shell 110 and the core 105 is "printed" or formed. The nozzle 220 shown in FIG. 4B includes a first cavity 515 for extruding the shell 110 and a second cavity 520 for filling the core 105 into the interior of the shell 110. The first cavity 515 may substantially encircle the second cavity 520. The second cavity 520 may be positioned so that the PCM 500 (not shown in FIG. 4B) can be deposited (or filled or extruded) into substantially the center of the thermoplastic polymer 505 shell 110 as it is extruded through the first cavity 515.

Figure 5A:
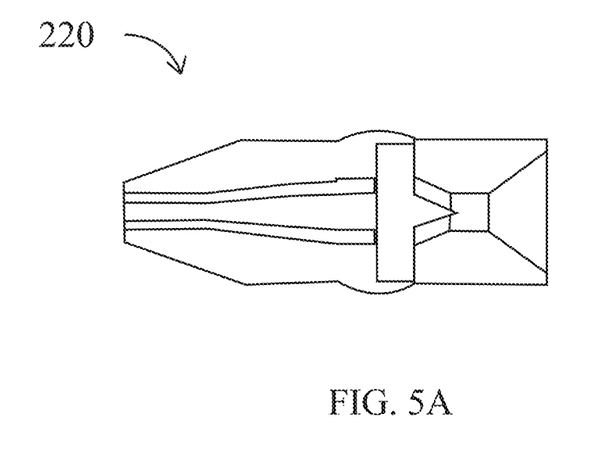
FIG. 5A illustrates a cross section view and FIG. 5B illustrates an exploded view of a nozzle featuring a spider die for extruding a TES device, according to some aspects of the present disclosure.
Figure 5B:
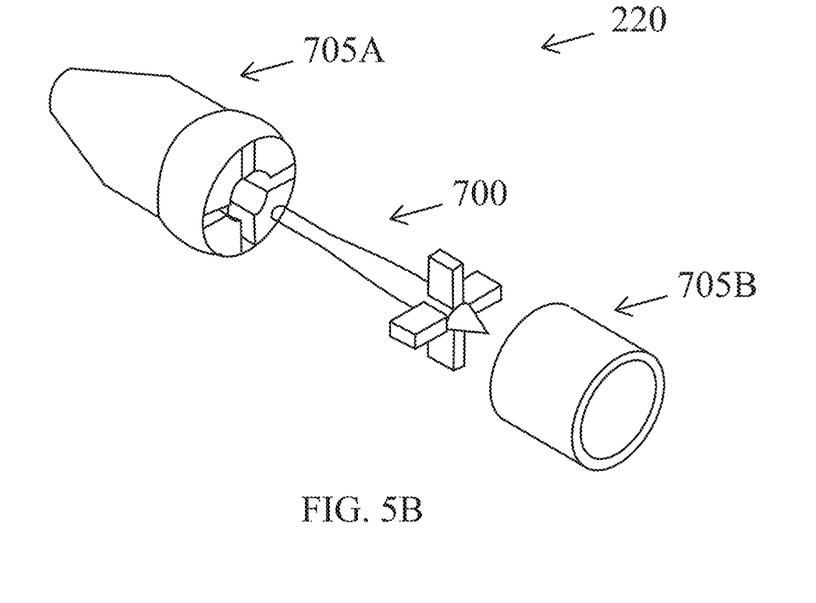

FIGS. 5A-B illustrate a nozzle 220 including a spider die 700, according to some aspects of the present disclosure. The extrusion nozzle 220 may take different geometries, this is only an exemplary nozzle 220 for desktop-scale hollow thermoplastic polymer shell 110 extrusion. Next, these components were precision machined out of 316L stainless steel, then fitted on a filament extruder (or nozzle 220), which herein may be called the TES device 100 extruder. A syringe-based system may be used to insert the PCM core 105 into the hollow thermoplastic polymer shell 110. The images shown in FIGS. 4A-B illustrate how to produce the TES device 100 filaments, with the PCM core 105 injected after the thermoplastic polymer shell 110 is extruded.

By printing the TES device 100 in a dual-extrusion nozzle 220 (as shown in FIG. 4B, 5A, or 5B), the present disclosure can co-print PCM 500 and a thermoplastic polymer 505 while achieving in-process encapsulation of the PCM. Introducing the two feedstocks (PCM and thermoplastic) using two separate channels/reservoirs allows independent control of each material's flow rate, enabling tuning of the PCM to thermoplastic ratio (which is also the ratio of storage/energy capacity provided by the PCM to the heat transfer/power provided by the thermoplastic). This provides an additional tuning parameter that can be leveraged in the topology optimization to further enhance device performance.

As shown in FIG. 4B, the PCM 500 can be deposited in the center of a thermoplastic polymer 505 passage to create the core 105 for the thermoplastic shell 110 of the TES device 100. As an alternative method to producing the TES device 100 as a filament (as shown in FIG. 2) and then printing in two separate steps, this can generate the TES device 100 directly using a 3D printer.

The nozzle 220 as shown in FIG. 4B, 5A, or 5B may be used with parameter control to allow controlled material release to enable spatial control over the fraction of PCM core to thermoplastic shell material to generate composites tailored to specific end use requirements. The amount of PCM and/or thermoplastic ratio (and thus volume) can be varied throughout the process, to create customized steps or layers. This provides flexibility to produce gradient-based structures tailored to specific environments for efficient energy management.

In some embodiments, the nozzle 220 as shown in FIGS. 5A-B may be created using laser powder bed fusion with a 17-4 PH stainless steel, which provides excellent mechanical properties, good corrosion resistance, and high strength in increased temperatures (i.e., up to 310° C.). This allows 17-4 PH stainless steel to be used as a nozzle 220 to print most polymer-based thermoplastics for the shell and PCMs with a melting temperature below 310° C. A thermoplastic used for the shell may be operable in temperatures between 20 and 300° C. The process uses the thermoplastic in the form of a filament, the processes described herein may be used in fused deposition modeling (FDM) or fused filament fabrication (FFF) machines, as shown in FIG. 2 or 4A.

FIG. 5B illustrates an exploded view of a nozzle 220 and spider die 700 for simultaneous extrusion of the TES device 100, according to some aspects of the present disclosure. The nozzle 220 for simultaneous extrusion and filling of the shell 110 (not shown in FIGS. 5A-B) and core 105 (not shown in FIGS. 5A-B) may include an outer body 705A and/or 705B for protecting the spider die 700. The spider die 700 may direct the flow of the thermoplastic polymer (to form the shell 110) and the PCM (to form the core) of the TES device 100.

Figure 6:
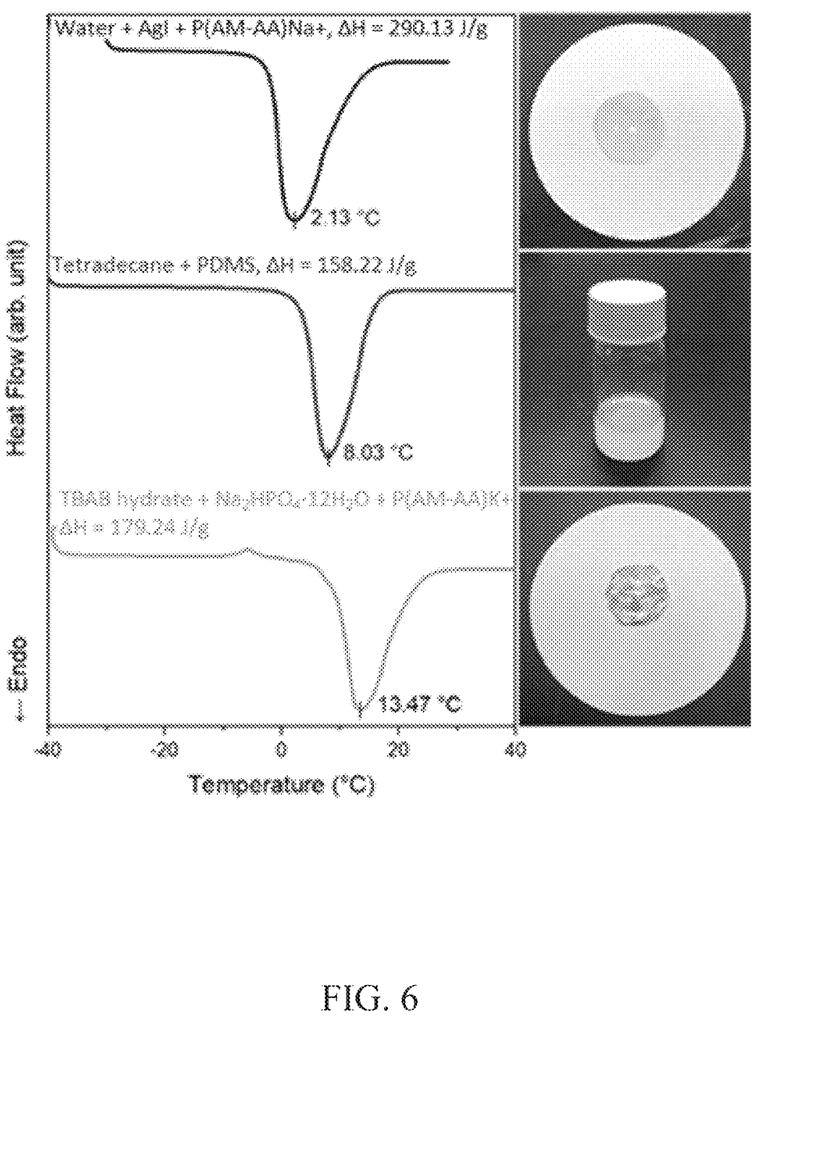
FIG. 6 illustrates transition temperature and latent heat of fusion for three formulations of phase change materials (PCMs) for use in TES devices, according to some aspects of the present disclosure.

FIG. 6 illustrates a comparison of the extruded TES device 100 as described in some embodiments herein to a conventional PCM thermal energy storage device. As shown in FIG. 6, reducing the convective and conductive thermal resistances in a PCM device using the methods described herein may increase the maximum thermal power of the device by approximately 2.7 times. Using a thermoplastic may improve the energy density of the device as described herein. The present disclosure leverages 3D printing to achieve optimized thermal designs which are not attainable using traditional manufacturing processes and can utilize advanced PCMs, such as salt-hydrate composites. As shown in FIG. 6, the geometry of the 3D printed PCM core-thermoplastic shell opens up the design space for thermal storage and allows for direct integration of the heat source/sink fluid channels into the composite, removing the need for costly and bulky flow channels and headers in conventions PCM TES devices).

Figure 7A:
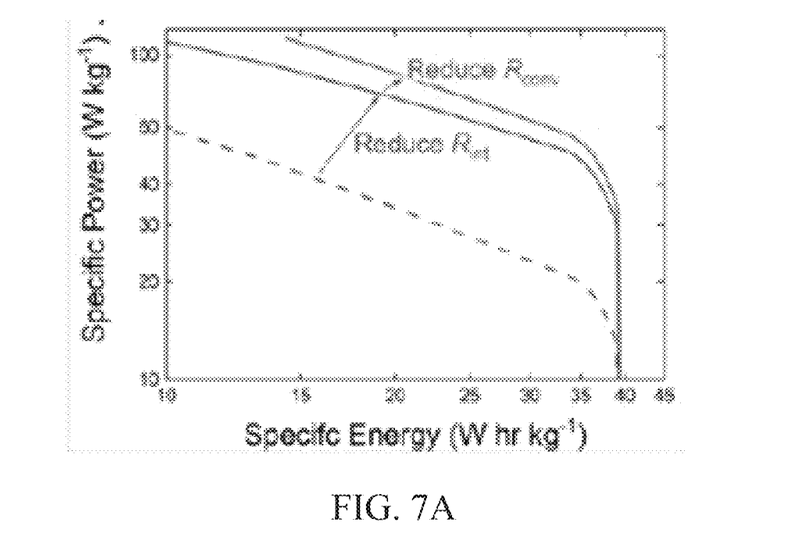
FIGS. 7A and 7B illustrates the improvement in specific power for the TES devices made according to some aspects of the present disclosure to traditional devices.
Figure 7B:
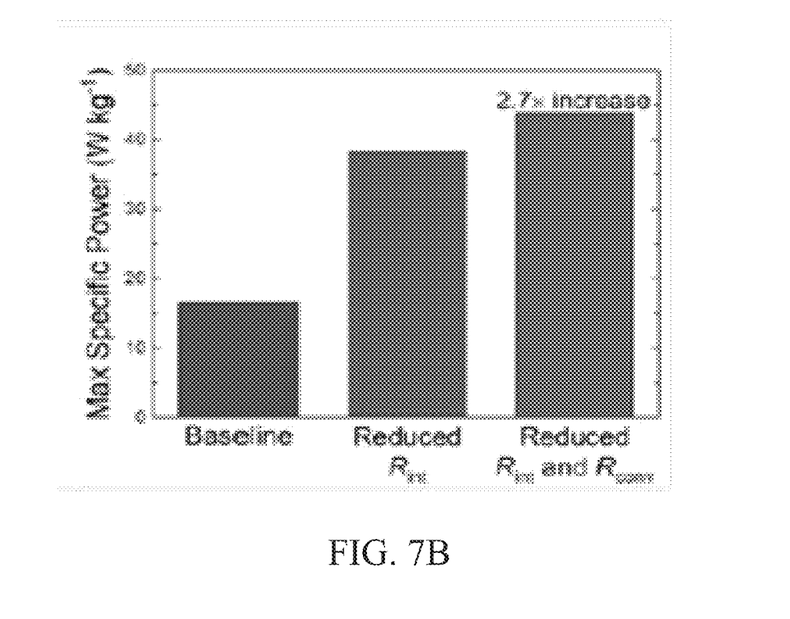

FIGS. 7A and 7B illustrates the improvement in specific power for the TES devices 100 made according to some aspects of the present disclosure to traditional devices. As shown in FIG. 7A, using additive manufacturing or 3D printing techniques to create designs 215 made of TES devices 100 may have a reduced convective thermal resistance by a factor of about two and reduced conductive thermal resistance by a factor of about three. This may be due to the design optimizations enabled by surrounding a PCM core 105 with a thermoplastic polymer shell 110 and forming designs 215 by additively manufacturing the TES device 100.

Figure 8:
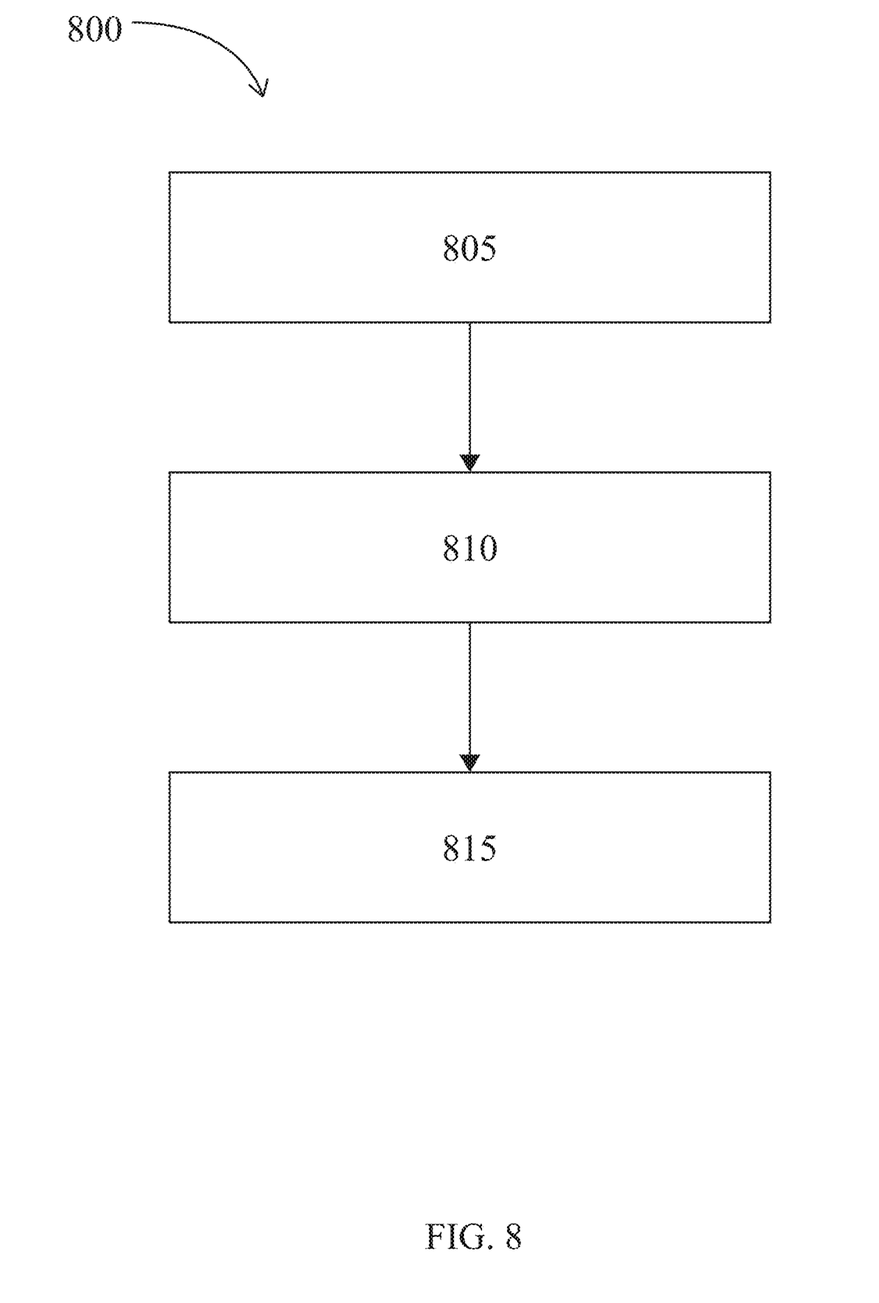
FIG. 8 illustrates a method for forming a TES device, according to some aspects of the present disclosure.

FIG. 8 illustrates a method 800 for forming a TES device 100, according to some aspects of the present disclosure. The method 800 includes extruding 805 a shell 110 of thermoplastic polymer, filling 810 a core 105 of PCM into the shell 110 (forming a TES device 100), and forming 815 a design 215 with the shell 110 and core 105.

The first step of the method 800 is extruding 805 a shell 110 of thermoplastic polymer. The second step of the method 800 is filling 810 a core 105 of PCM into the shell 110. In some embodiments, the extruding 805 and filling 810 may be formed sequentially (as shown in FIG. 2) to create a filament. The filament may be used in a 3D printer to form a design 215. In other embodiments, the extruding 805 and the filling 810 may be performed substantially simultaneously (as shown in FIG. 4A) using a special nozzle 220 designed to create a core 105 and shell 110. The extruding 805 may be done at a temperature higher than the melting temperature of the thermoplastic polymer. When the extruding 805 and filling 810 are performed substantially simultaneously the temperature may be high enough to melt the thermoplastic polymer, but not degrade the PCM core.

The present disclosure addresses common problems associated with using PCMs, including leakage issues. Encapsulating PCM in a core with a thermoplastic can prevent leakage, while providing efficient heat transfer through the conductive path of the thermoplastic shell material.

In some embodiments, the devices and processes described herein may be used to develop and generate PCM composite materials for thermal energy storage applications, such as in building heating, ventilation, and air conditioning (HVAC) systems. Other embodiments may use the devices and processes described herein for other applications, in situations when one material is desired to be extruded into another material. The method of co-extrusion (or co-printing) as described herein may be applied to materials beyond PCMs and thermoplastics.

Examples

Example 1. A thermal energy storage device comprising: a shell comprising a thermoplastic polymer; and a core comprising a phase change material; wherein:
the shell comprises a length and an interior, and
the core is positioned within the interior of the shell and extends through the length of the shell.

Example 2. The device of Example 2, wherein the thermoplastic polymer comprises polycaprolactone (PCL), thermoplastic polyurethane (TPU), polylactic acid (PLA), acrylonitrile butadiene styrene (ABS), polyvinyl alcohol (PVA), polyethylene terephthalate (PET), and/or polycarbonate (PC).

Example 3. The device of Example 1 or Example 2, wherein the phase change material comprises a salt hydrate, a hydrogel, and a nucleating agent.

Example 4. The device of Example 3, wherein the salt hydrate comprises sodium sulfate decahydrate, calcium chloride hexahydrate, disodium hydrogen phosphate dodecahydrate, and/or sodium acetate trihydrate.

Example 5. The device of Example 3 or Example 4, wherein the hydrogel comprises poly(acrylamide-co-acrylic acid).

Example 6. The device of any one of Examples 3-5, wherein the nucleating agent comprises borax.

Example 7. The device of any one of Examples 3-6, wherein the phase change material comprises about 1-10 wt % hydrogel, 1-5 wt % nucleating agent, and 99-85 wt % salt hydrate.

Example 8. The device of any one of Examples 1-7, wherein the phase change material has a subcooling temperature of 2-10° C.

Example 9. The device of any one of Examples 1-8, wherein the interior has a substantially circular cross-section.

Example 10. A method of additive manufacturing a phase change material, the method comprising:
  extruding a shell comprising a thermoplastic polymer and having a length and an interior; and
  filling a core comprising the phase change material into the interior of the shell; wherein:
  the core extends the length of the shell.

Example 11. The method of Example 10, wherein the extruding and the filling are performed substantially simultaneously.

Example 12. The method of Example 10 or Example 11, wherein the extruding and filling are performed at 75-100° C.

Example 13. The method of any one of Examples 10-12, further comprising:
  forming a design with the shell and the core on a bed.

Example 14. The method of Example 13, wherein the design comprises a thermal energy storage device comprising a thermal battery and/or heat exchanger.

Example 15. The method of Example 13 or Example 14, wherein the bed has a temperature of 40-90° C.

Example 16. The method of any one of Examples 10-15, wherein the extruding and the filling are performed using a nozzle.

Example 17. The method of Example 16, wherein the nozzle comprises a spider die.

Example 18. The method of any one of Examples 10-17, wherein the thermoplastic polymer comprises polycaprolactone (PCL), thermoplastic polyurethane (TPU), polylactic acid (PLA), acrylonitrile butadiene styrene (ABS), polyvinyl alcohol (PVA), polyethylene terephthalate (PET), and/or polycarbonate (PC).

Example 19. The method of any one of Examples 10-18, wherein the phase change material comprises a salt hydrate.

Example 20. The method of Example 19, wherein the salt hydrate comprises at least one of sodium sulfate decahydrate, calcium chloride hexahydrate, disodium hydrogen phosphate dodecahydrate, or sodium acetate trihydrate.

Example 21. The method of any one of Examples 10-20, wherein the interior has a substantially circular cross-section.

Example 22. A system for additive manufacturing a phase change material, the system comprising:
  a nozzle;
  a thermoplastic polymer; and
  the phase change material; wherein:
  the nozzle is configured to extrude a shell comprising the thermoplastic polymer and having a length and an interior;
  the nozzle is configured to fill a core comprising the phase change material into the interior of the shell; and
  the core extends the length of the shell.

Example 23. The system of Example 22, wherein the nozzle comprises a spider die.

Example 24. The system of Example 22 or Example 23, wherein the thermoplastic polymer comprises polycaprolactone (PCL), thermoplastic polyurethane (TPU), polylactic acid (PLA), acrylonitrile butadiene styrene (ABS), polyvinyl alcohol (PVA), polyethylene terephthalate (PET), and/or polycarbonate (PC).

Example 25. The system of any one of Examples 22-24, wherein the phase change material comprises a salt hydrate.

Example 26. The system of any one of Example 22-25, wherein the salt hydrate comprises sodium sulfate decahydrate, calcium chloride hexahydrate, disodium hydrogen phosphate dodecahydrate, and/or sodium acetate trihydrate.

Example 27. The system of any one of Examples 22-26, wherein the interior has a substantially circular cross-section.

Example 28. The system of any one of Examples 22-27 wherein:
  the nozzle has a temperature of 75-100° C.

Example 29. The system of any one of Examples 22-28, wherein:
  the shell and the core are configured to form a design on a bed.

Example 30. The system of Example 29, wherein the bed has a temperature of approximately 40-90° C.

Example 31. The system of Example 29 or Example 30, wherein the design comprises a thermal energy storage device comprising a thermal battery and/or a heat exchanger.

The foregoing discussion and examples have been presented for purposes of illustration and description. The foregoing is not intended to limit the aspects, embodiments, or configurations to the form or forms disclosed herein. In the foregoing Detailed Description, for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, invention aspects lie in less than all features of a single foregoing disclosed embodiment, configuration, or aspect. While certain aspects of conventional technology have been discussed to facilitate disclosure of some embodiments of the present invention, the Applicant in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A thermal energy storage filament device for additive manufacturing, the device comprising:
  a shell comprising an extruded thermoplastic polymer; and
  a filled core comprising a phase change material; wherein:
  the phase change material comprises a salt hydrate, a hydrogel, and a nucleating agent,
  the salt hydrate comprises tetrabutylammonium bromide (TBAB) hydrate,
  the hydrogel comprises poly (acrylamide-co-acrylic acid),
  the nucleating agent comprises sodium phosphate dibasic dodecahydrate,
  the shell comprises a length and an interior, the filled core is positioned within the interior of the shell and extends through the length of the shell; and the extruded thermoplastic polymer comprises a base polymer and a high thermal conductivity filler.

2. The device of claim 1, wherein the base polymer comprises polycaprolactone (PCL), thermoplastic polyurethane (TPU), polylactic acid (PLA), acrylonitrile butadiene styrene (ABS), polyvinyl alcohol (PVA), polyethylene terephthalate (PET), and/or polycarbonate (PC).

3. The device of claim 1, wherein the extruded thermoplastic polymer has a thermal conductivity greater than about 1 W/m·K.

4. The device of claim 1, wherein the salt hydrate comprises sodium sulfate decahydrate, calcium chloride hexahydrate, disodium hydrogen phosphate dodecahydrate, and/or sodium acetate trihydrate.

5. The device of claim 1, wherein the nucleating agent comprises borax or silver iodide (AgI).

6. The device of claim 1, wherein the phase change material comprises about 1-10 wt % hydrogel, 1-5 wt % nucleating agent, and 85-99 wt % salt hydrate.

7. The device of claim 1, wherein the high thermal conductivity filler comprises hexagonal boron nitride and carbon black.

* * * * *